Sept. 15, 1959 U. KESTEN ET AL 2,904,635

ALLOCATION OF OUTGOING LINES IN AUTOMATIC TELECOMMUNICATION SYSTEMS

Filed March 28, 1955

Inventors.
Ulrich Kesten, &
Hans-Joachim Lurk.
By [signature] Atty.

United States Patent Office 2,904,635

Patented Sept. 15, 1959

2,904,635

ALLOCATION OF OUTGOING LINES IN AUTOMATIC TELECOMMUNICATION SYSTEMS

Ulrich Kesten and Hans-Joachim Lurk, Munich, Germany, assignors to Siemens & Halske Aktiengesellschaft, Munich, Germany, a German corporation Application March 28, 1955, Serial No. 497,308

In Germany March 2, 1950

Public Law 619, August 23, 1954

Patent expires March 2, 1970

13 Claims. (Cl. 179—18)

Figures 1, 2:
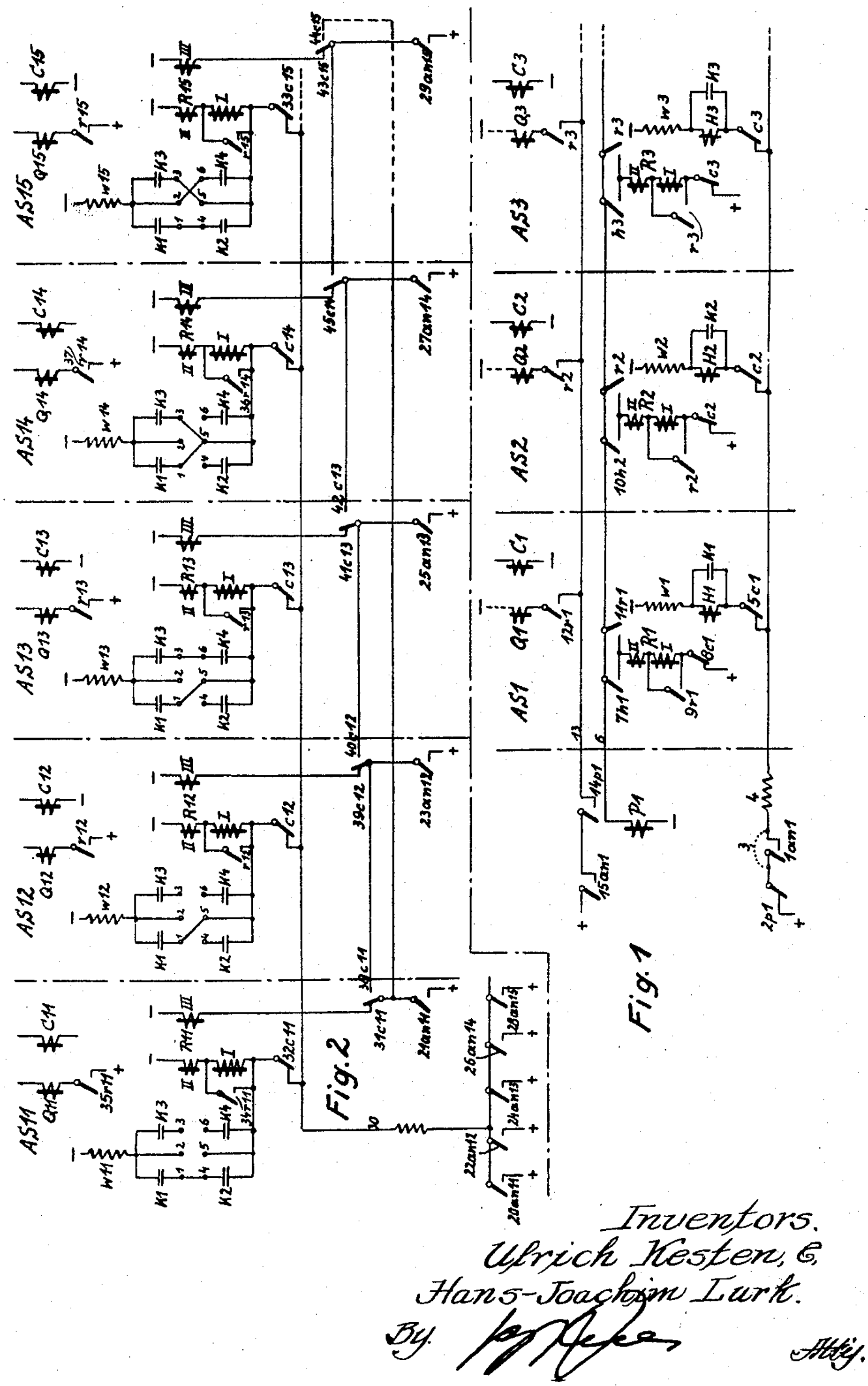

This invention relates to a circuit arrangement for the readying of an idle line out of several outgoing lines in telecommunication systems, and in particular automatic telephone or teleprinter systems.

An idle outgoing line is readied by common switching devices, such as chain relay circuits or allotters. In systems with switching mechanisms of the line finder type, a readied outgoing line may be connected by a rotary switch, a two-motion switch, a motor-driven switch, or a cross-bar switch, or in relay systems by a connecting relay, to an incoming line identified by a calling signal which has become operative.

If a disturbance occurs at the switching device common to all outgoing lines, at least part of the outgoing lines will be blocked for the duration of the disturbance, which may result in considerable restriction of the traffic. Underlying the invention is the problem how to prevent such far-reaching restrictions in case of disturbance at the common readying device. The invention proposes to solve the problem by disposing relays which control the inlets to the outgoing lines in parallel to a control conductor, and providing delaying devices (sequence chain) coordinated or associated with the relays to effect the seizure of only one outgoing line.

A disturbance of one of the parallel circuits or of one contact of the contacts controlled by the parallel-connected relays can always block only the respective outgoing line but has no effect on the readiness for service of the other outgoing lines.

The known chain circuits make it possible to allot to individual groups of incoming lines a certain outgoing line or group of outgoing lines as the one to be used first. According to the invention, this advantage of the chain relay circuits is combined with the advantage of little effect of a disturbance occurring in a parallel-connected connecting relay (a sequence chain) on the traffic, in that besides the sequence chain a conventional chain relay circuit is provided for the readying of a free outgoing line.

A signal initiating the joining of an incoming with an outgoing line is given simultaneously over the sequence chain and over the chain relay circuit.

The invention will now be explained with reference to the accompanying drawing showing in Figs. 1 and 2 in diagrammatic manner two examples thereof.

Only the switching means and circuits indispensable for the understanding of the invention are shown in the drawings. The equipment of the incoming and outgoing lines is not shown, as it is known and does not form part of the invention. In both examples it is assumed that outgoing lines are connected by line finders to calling incoming lines. The line finders may be of any suitable known design. They may be step-by-step switch mechanisms, motor-driven switches, crossbar switches, or relay switches.

In the embodiment shown in Fig. 1, an idle outgoing line may be held ready for service at all times; or readying may occur only as a calling signal arrives on an incoming line.

If an idle outgoing line is to be ready at all times, contact *1an1* (bottom of Fig. 1) must be replaced by the jumper 3 shown in broken lines.

Upon connection of the service battery, energizing circuits are closed for the auxiliary relays (preparing relays) H1, H2, H3, etc., which are respectively associated with the connecting relays R1, R2, R3, etc., the circuit for relay H1 extending (1) From +, contact *2p1*, jumper 3, resistor 4, contact *5c1*

$$\frac{\text{Relay H1}}{\text{capacitor K1}}$$

resistor *w1*, to —.

Relays H2, H3, etc., operate in parallel with H1, each having again a capacitor connected parallel to it and a resistor serially related thereto. The different magnitude of the resistors *w1*, *w2*, *w3*, etc. and the different capacities of the capacitors K1, K2, K3, impart to the relays H1, H2, H3, etc. different response delays, causing sequential operation thereof, relay H1 responding first, relay H2 responding with a delay of some ms., relay H3 responding thereafter, etc. The first energized relay H1 connects the connecting relay R1 to the common conductor 6 at contact *7h1* in a circuit extending (2) From —, relay P1, conductor 6, contact *7h1*, connecting relay R1 windings II and I, contact *8c1* to +.

At contact *9r1*, the high resistance winding I of relay R1 is short-circuited and the potential on conductor 6 is thereby reduced so that if for example contact *10h2* should close before energization of relay P1 and consequent opening of the energizing circuits for the other H relays at contact *2p1*, relay R2 receives insufficient operating current.

At contact *11r1* contact *7h1* is bridged. At contact *12r1* the start relay Q1 is connected to the conductor 13. At contact *2p1* relay P1 opens the circuit "1" and hence also the energizing circuits for the other H relays. All H relays release. At contact *14p1* a circuit is prepared for the actuation of the start relay Q1.

If a call arrives on one of the incoming lines (not shown), a group relay (not shown) is energized, which closes the contact *15an1*. The start relay Q1 now energizes in a circuit (3) From +, contacts *15an1*, *14p1*, conductor 13, contact *12r1*, relay Q1, . . . to —.

Relay C energizes during or after connection of the readied outgoing line over the line finder AS1 to the calling incoming line. It opens the contacts *5c1* and *8c1*. Circuit "2" is accordingly interrupted. Relay P1 releases and closes the energizing circuits for the H relays of the idle outgoing lines. The first to energize is now relay H2, which by connection of the connecting relay R2 causes the readying of the second outgoing line to be joined with another calling line through line finder AS2.

Relay C1 releases upon termination of the connection through line finder AS1 and closes contacts *5c1* and *8c1*. As contact *2p1* is open, the energizing circuit "1" for the H relays are not prepared. Only after a readied line, for example the second outgoing line, has been coupled with a calling line through line finder AS2, and relay P1 deenergized, are the energizing circuits for the H relays of the sequence chain prepared. Relay H1 again energizes first and makes the first outgoing line available for a new connection.

If there is no jumper 3, circuit "1" is completed only as a call becomes operative on an incoming line and as contact *1an1* closes. The mode of operation is then analogous to that described.

The arrangement may be such that in times of heavy traffic contact *1an1* is short-circuited by the jumper 3, and in time of light traffic, for example at night or Sundays and holidays, this short circuit is removed. The temporary bridging of contact 1$an$1 may be effected by a suitable manually operated switch or automatically in known and suitable manner under the control of a clock.

In the embodiment according to Fig. 2, the incoming lines are subdivided into several groups. To each group is allotted an outgoing line with its line finder as the one to be used first. Each group of incoming lines has a common call receiving relay. Only two contacts of each group of five call receiving relays are shown. Contacts 20$an$11, 21$an$11 are closed incident to calls from lines of group 1, and contacts 22$an$12, 23$an$12 etc. are closed incident to calls from lines of group 2. Through the contacts 21$an$11, 23$an$12, 25$an$13, 27$an$14 and 29$an$15, calling signals are transmitted over a conventional chain relay circuit to the individual outgoing lines or line finders AS11 to AS15, while through contacts 20$an$11 . . . 28$an$15 a control of the connecting relays R11–R15 is effected by a sequence chain.

The connecting relays R11 to R15 energize with delay because each has a capacitor-resistor arrangement connected in parallel with its windings I and II. Each capacitor-resistor arrangement comprises a resistor and four capacitors K1–K4. By means of a distributor having six connection points 1–6 it is possible to connect in parallel with each connecting relay a different capacitor in series with the respectively associated resistor. Windings I and II of relay R11 are thus in parallel with the capacitors K1, K2 connected in series over the connection points 1 and 4 with resistor $w$11, while windings I and II of relay R12 are in parallel with capacitor K1 in series with resistor $w$12, windings I and II of relay R13 being in parallel with the capacitors $$\frac{\mathrm{K1}}{\mathrm{K3,\,K4}}$$

in series with resistor $w$13, etc. Since relay R11 is in parallel with the smallest and relay R15 with the greatest capacitance, relay R11 has the smallest and relay R15 the greatest energizing delay. The connecting relays R11–R15 with the capacitor-resistor arrangements respectively in parallel therewith form the sequence chain.

When current flows through their windings III, the connecting relays R11 to R15 energize without delay.

The contacts 20$an$11 and 21$an$11 are closed responsive to a calling signal, thereby completing the following circuits, namely (4) From +, contacts 21$an$11, 31$c$11, relay R11 winding III to —; and (5) From +, contact 20$an$11, resistor, conductor 30, contact 32$c$11, $$\frac{\text{relay R11 windings I and II}}{\text{capacitors K2, K1, resistor } w\mathbf{11}}\text{ to }-$$

Parallel to circuit "5" current is carried also through windings I and II of each of the relays R12 to R15 and the capacitor-resistor arrangements lying respectively in parallel therewith, thus for example through the readying device of the outgoing line which is associated with line finder AS15, in a circuit (6) From +, contact 20$an$11, resistor, conductor 30, $$\text{Contact } \mathbf{33}c\mathbf{15}\left\{\begin{array}{l}\text{relay R15, windings I and II to } -\\ \left.\begin{array}{l}\text{capacitors K2, K1}\\ \text{capacitor K3}\\ \text{capacitor K4}\end{array}\right\}\text{resistor } w\mathbf{15}\text{, to } -\end{array}\right.$$

As has been mentioned, if current would flow only through their windings I and II in the sequence chain, relay R11 would be the first to energize and relay R15 the last.

Relay R11 responds without delay over the chain relay circuit "4." At contact 34$r$11 it shunts its high resistance winding I and thereby prevents any of the relays R12–R15 from energizing over the sequence chain after the charging of the parallel capacitors. At contact 35$r$11, the start relay O11 of line finder AS11 is connected. When the line finder finds the calling line, relay C11 energizes. It opens the contacts 32$c$11, 31$c$11. At contact 38$c$11 the chain relay circuit is extended. At the same time, if there is no other pending call, the call receiving relay controlling contacts 20$an$11 and 21$an$11 is disconnected and these contacts are accordingly also opened. Due to disconnection of the positive potential, the capacitors of the sequence chain discharge over their respective connecting relays which do not energize responsive to the discharge current.

When a call comes in on a line of the fourth group, contacts 26$an$14 and 27$an$14 are closed. For the connecting relay R14, an energizing circuit is closed over its winding III when line finder AS14 is idle. Relay R14 energizes without delay and by short-circuiting its winding I at contact 36$r$14 prevents the connecting relays of the other line finders from energizing over the sequence chain after the charging of their parallel capacitors. Only line finder AS14 is started by connection of its start relay Q14 at contact 37$r$14, for searching for the calling line.

It shall now be assumed that line finders AS11, AS12 and AS15 as well as other line finders that may be present are blocked. In the chain relay circuit the contacts 31$c$11, 39$c$12, 43$c$15 are open. The contacts 38$c$11, 40$c$12 and 44$c$15 are closed. If with this condition a call comes in on a line of the group whose common call receiving relay controls the contacts 28$an$15 and 29$an$15, the energizing circuit will be closed over the windings I and II of the connecting relays R13 and R14 (sequence chain) which extend in parallel from the conductor 30. Over the contact chain, a circuit is completed for relay R3 winding III of the idle line finder AS13

(7) From +, contacts 29$an$15, 44$c$15, 38$c$11, 40$c$12, 41$c$13, relay R13 winding III to —.

Relay R13 energizes without delay, connects the start relay Q13, and by shunting its high resistance winding I prevents energization of relay R14 whose windings I and II are connected to the conductor 30.

It will be seen from the foregoing explanations that calling signals are immediately passed on to idle outgoing lines over the relay chain circuits as long as these circuits operate satisfactorily. If the chain relay circuit is out of order, for example, if the contact 38$c$11 over which the calling signals must due to the blocking of the finder AS11 act on the connecting relay, fails to close, then the connecting relay will be caused to energize over the sequence chain, that is, through their windings I and II parallel with the conductor 30. The connecting relays are caused to energize over the sequence chain, not simultaneously, but successively at intervals determined by the respective response delay, only one line finder at a time being started through the sequence chain just as through the contact chain circuit.

Changes may be made within the scope and spirit of the appended claims.

We claim:

1. In an automatic telecommunication system having a plurality of outgoing lines accessible to switches and having first control relays respectively individual to said switches, a device common to a plurality of said first control relays for controlling the operation thereof to ready the switches respectively associated therewith for operation in extending calls thereover, said device comprising a plurality of second control relays for respectively controlling the operation of said first control relays, a common control conductor, circuit means for connecting said second control relays in parallel to said control conductor, and delay means respectively associated with said second relays for imparting thereto respectively different slow-to-operate characteristics to assure at any time seizure of only one outgoing line, said delay means being connected to said control conductor and comprising resistor-capacitor means connected in parallel with a winding of each of said second control relays.

2. A system and cooperation of elements according to claim 1, comprising signal means operative to indicate seizure of an outgoing line, connecting relays respectively associated with said second control relays, and circuit means governed by said second control relays for sequentially operating said connecting relays.

3. A system and cooperation of elements according to claim 1, comprising signal means operative to indicate seizure of an outgoing line, connecting relays respectively associated with said second control relays, circuit means governed by said second control relays for sequentially operating said connecting relays, and circuit means governed by the respective connecting relays for inhibiting the operation of other connecting relays.

4. A system and cooperation of elements according to claim 1, comprising signal means operative to indicate seizure of an outgoing line, connecting relays respectively associated with said second control relays, circuit means governed by said second control relays for sequentially operating said connecting relays, and circuit means controlled by one connecting relay upon operation thereof for connecting to the said control conductor a blocking potential to inhibit the operation of other connecting relays.

5. A system and cooperation of elements according to claim 1, comprising signal means operative to indicate seizure of an outgoing line, connecting relays respectively associated with said second control relays, circuit means governed by said second control relays for sequentially operating said connecting relays, circuit means controlled by one connecting relay upon operation thereof for connecting to the said control conductor a blocking potential to inhibit the operation of other connecting relays, a high resistance winding forming part of said connecting relay, and means for shunting said high resistance winding to produce said blocking potential.

6. A system and cooperation of elements according to claim 1, comprising an auxiliary relay for disconnecting said second control relays, and means for operating said auxiliary relay over said control conductor which is common to said connecting relays.

7. A system and cooperation of elements according to claim 1, comprising signal means operative to indicate seizure of an outgoing line, connecting relays respectively associated with said second control relays, circuit means governed by said second control relays for sequentially operating said connecting relays, a start relay for each line, means operative in the normal circuit condition of said system for readying the outgoing line to be seized first, and signal means for effecting the seizure of said readied line.

8. A system and cooperation of elements according to claim 1, comprising connecting relays with different slow-to-energize characteristics.

9. The system and cooperation of elements according to claim 1, comprising a contact chain for controlling said relays.

10. A system and cooperation of elements according to claim 1, comprising a contact chain for controlling said relays, means for signalling the joining of an incoming line with an outgoing line, and circuit means for transmitting signals effected by said signal means jointly with said delay means and said contact chain.

11. A system and cooperation of elements according to claim 1, comprising a contact chain for controlling said relays, means for signalling the joining of an incoming line with an outgoing line, circuit means for transmitting signals effected by said signal means jointly with said delay means and said contact chain, connecting relays, and circuit means for jointly controlling the operation of said connecting relays from said delay means and from said contact chain.

12. A system and cooperation of elements according to claim 1, comprising a contact chain for controlling said relays, means for signalling the joining of an incoming line with an outgoing line, circuit means for transmitting signals effected by said signal means jointly with said delay means and said contact chain, connecting relays, circuit means for jointly controlling the operation of said connecting relays from said delay means and from said contact chain, and means operable from said contact chain for causing said connecting relays to operate without delay.

13. A system and cooperation of elements according to claim 1, comprising connecting relays with different slow-to-energize characteristics, an outgoing line associated with a group of incoming lines which is preferentially seized, the connecting relay associated with said outgoing line preventing upon actuation thereof operation of another connecting relay over said contact chain.

References Cited in the file of this patent

UNITED STATES PATENTS

| | | |
|---|---|---|
| 2,149,646 | Voss | Mar. 7, 1939 |
| 2,201,651 | Hatton | May 21, 1940 |
| 2,431,850 | Voss | Dec. 2, 1947 |
| 2,600,648 | Herrick | June 17, 1952 |
| 2,631,277 | Den Hertog | Oct. 7, 1952 |
| 2,709,720 | Schauer | May 31, 1955 |